(12) United States Patent
Saltzer et al.

(10) Patent No.: US 10,193,243 B2
(45) Date of Patent: Jan. 29, 2019

(54) HIGH VOLTAGE POWER CABLE JOINT DEVICE AND A POWER CABLE COMPRISING THE SAME

(71) Applicant: NKT HV Cables GmbH, Baden (CH)

(72) Inventors: Markus Saltzer, Fislisbach (CH); Fredrik Fälth, Karlskrona (SE); Fredrik Axelsson, Partille (SE)

(73) Assignee: NKT HV Cables GmbH, Baden (CH)

( * ) Notice: Subject to any disclaimer, the term of this patent is extended or adjusted under 35 U.S.C. 154(b) by 0 days.

(21) Appl. No.: 16/064,053

(22) PCT Filed: Nov. 15, 2016

(86) PCT No.: PCT/EP2016/077742
§ 371 (c)(1),
(2) Date: Jun. 20, 2018

(87) PCT Pub. No.: WO2017/108273
PCT Pub. Date: Jun. 29, 2017

(65) Prior Publication Data
US 2018/0358714 A1    Dec. 13, 2018

(30) Foreign Application Priority Data
Dec. 23, 2015   (EP) .................................... 15202257

(51) Int. Cl.
*H01R 4/36*    (2006.01)
*H01R 4/70*    (2006.01)
*H01R 11/07*   (2006.01)

(52) U.S. Cl.
CPC ............... *H01R 4/36* (2013.01); *H01R 4/363* (2013.01); *H01R 4/70* (2013.01); *H01R 11/07* (2013.01)

(58) Field of Classification Search
CPC . H01R 4/363; H01R 4/36; H01R 4/70; H01R 11/70
(Continued)

(56) References Cited

U.S. PATENT DOCUMENTS 3,796,821 A    3/1974  Lusk
3,864,013 A *  2/1975  Levy ........................ H01R 4/20
                                                           174/84 C
(Continued)

FOREIGN PATENT DOCUMENTS

EP    2128932 A2   12/2009
EP    2197080 A1    6/2010
WO    0054371 A1    9/2000

OTHER PUBLICATIONS

European Search Report Application No. EP 15 20 2257.0 Completed: Jun. 9, 2016 10 pages.
(Continued)

*Primary Examiner* — Gary F Paumen
(74) *Attorney, Agent, or Firm* — Whitmyer IP Group LLC

(57) ABSTRACT

The present disclosure relates to a high voltage power cable joint device including: an elongated conductive connector having a first and second end faces, a field control body having a first semiconducting layer arranged circumferentially around the entire connector, and extending beyond the end faces, wherein the first and second end faces are provided with first and second bore sections which extend parallel with and are arranged offset from the central axis of the connector. The connector has an outer surface that has a first and second outer portions where the connector wall is generally the thinnest towards the first and second bore sections. Furthermore, the connector has a straight first through-opening which extends from the first outer surface portion to the first bore section, wherein a straight second through-opening is axially displaced from the first through-
(Continued)

opening and extends from the second outer surface portion to the second bore section. There is also disclosed a high voltage power cable including a high voltage power cable joint device.

20 Claims, 4 Drawing Sheets

(58) Field of Classification Search
USPC .................................................. 439/797, 796
See application file for complete search history.

(56) References Cited

U.S. PATENT DOCUMENTS

| | | | |
|---|---|---|---|
| 4,269,465 A | 5/1981 | Mueller | |
| 4,681,985 A | 7/1987 | Katz et al. | |
| 5,000,705 A * | 3/1991 | Kinka | H01R 4/5091 439/791 |
| 5,336,100 A * | 8/1994 | Gabrius | H01R 25/14 439/115 |
| 5,630,737 A * | 5/1997 | Dupont | H01R 4/26 439/431 |
| 6,042,430 A * | 3/2000 | Hollick | F16B 31/021 411/309 |
| 6,875,045 B1 * | 4/2005 | Hollick | H01R 4/363 439/411 |
| 7,090,532 B1 * | 8/2006 | Kaine | H01R 13/5205 439/523 |
| 8,550,842 B1 * | 10/2013 | Gutierrez | H01R 4/36 174/74 R |
| 8,981,224 B2 * | 3/2015 | Kehl | H01R 4/70 174/84 R |
| 9,472,865 B2 * | 10/2016 | Frank | H01R 4/307 |
| 2004/0102081 A1 * | 5/2004 | Buyst | H01R 4/36 439/447 |
| 2013/0056268 A1 * | 3/2013 | Bumgarner | H01R 4/363 174/94 R |
| 2015/0155640 A1 * | 6/2015 | Frank | H01R 4/307 439/797 |

OTHER PUBLICATIONS

International Search Report and Written Opinion of the International Searching Authority Application No. PCT/EP2016/077742 Completed: Feb. 2, 2017; dated Feb. 9, 2017 14 pages.
International Preliminary Report on Patentability Application No. PCT/EP2016/077742 dated Dec. 6, 2017 7 pages.
Klaus-Dieter Haim: "Trends in Conductor Cross-Section & Connector Design", Oct. 4, 2013 (Oct. 4, 2013), XP055278962, Retrieved from the Internet on Sep. 5, 2017: URL: http://www.inmr.com/trends-conductor-cross-section-connector-design/ 7 pages.

* cited by examiner

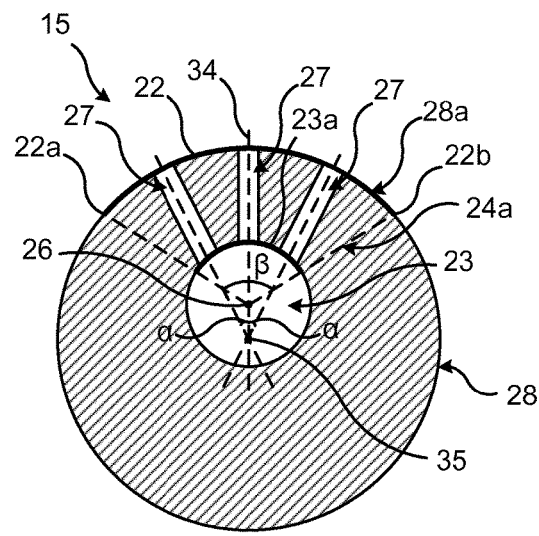
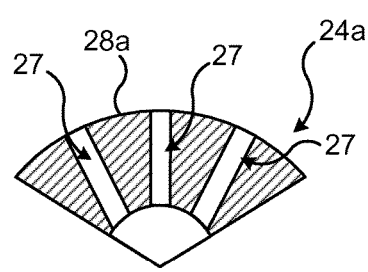
Fig. 7a　　　　　　　　　Fig. 7b
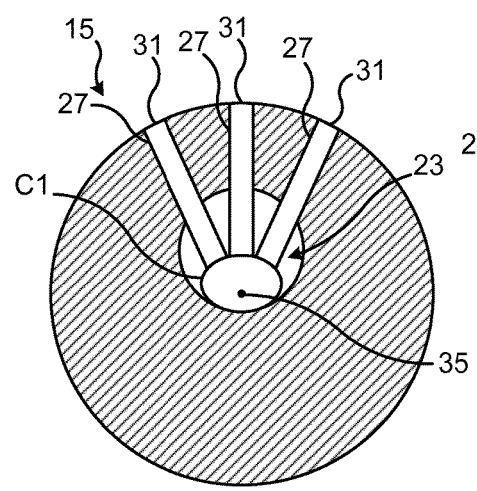
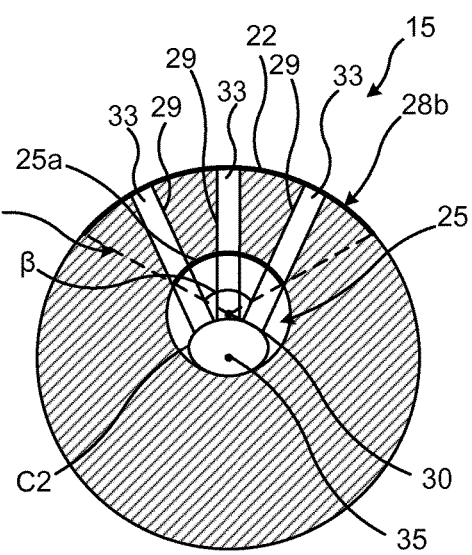
Fig. 8a　　　　　　　　　Fig. 8b

HIGH VOLTAGE POWER CABLE JOINT DEVICE AND A POWER CABLE COMPRISING THE SAME

TECHNICAL FIELD

The present disclosure generally relates to power cables. In particular, it relates to a high voltage power cable joint device for jointing two sections of a power cable, and to a high voltage power cable comprising such a joint device.

BACKGROUND

Joint devices are typically used for connecting two cable ends in an extruded cable system. Such cables typically comprise a conductor and an insulation system surrounding the conductor. The insulation system may include inner and outer semiconducting layers for screening, and an intermediate electrical insulation layer arranged between the semiconducting layers.

Two types of joints are common, namely factory joints and prefabricated joints. Often they may also be referred to as sea (factory) and land (prefabricated) joints. This relates to the transport situation on land, where short cable sections are transported to the laying site on drums, and many joints need to be installed on site. Boats transporting sea cables to a site may load more than a hundred kilometers, and the required jointing can be done under factory conditions, prior to loading and transport.

Contrary to a factory joint, where the insulation material is applied directly onto the conductor, a prefabricated joint is mounted onto the insulation system of the cable. A prefabricated joint may include a field control body which includes at least one semiconducting layer and an electrical insulation layer which control the electric field, and a connector that completes the metallic link between the two cable conductors for current transfer.

FIG. 1 shows a standard connector 1 which forms part of a prefabricated joint, and two cable ends provided with respective conductors 5a, 5b, and electrical insulation systems 3a, 3b. The conductors 5a and 5b are generally attached to the connector 1 by means of respective screws 7a and 7b. In the ideal case the connector 1 is well centred, as shown in FIG. 1. This minimises the pressure difference around the cable circumference.

The screws 7a, 7b may typically be arranged on one side of the connector 1, pushing down the conductors 5a, 5b towards the inner surface of the connector 1. However, due to (a) the conductor not being solid, and (b) the inner radius of the connector for installation purposes being larger than the conductor radius, the connector 1 will not end up in a centred position shown in FIG. 1 once the screws 7a and 7b have been tightened, as illustrated in FIGS. 2a and 2b. The deformed conductor 5a will be pressed towards the opposite side of the connecter 1 and, as an unintended consequence the connector 1 will be pushed upwards, creating a bigger step between the connector and the electrical insulation system 3a, 3b surface on the screw side, than on the opposite side.

If the step $d_{top}$ between the connector 1 and electrical insulation system 3a, 3b is large enough, a relatively large gap length $I_{gap}$ between the two materials will form compared to the situation when the connector 1 would not be pressed downwards due to the screws, as shown in FIGS. 3a and 3b. This gap may be formed between a deflector 9 of the joint, which controls the field distribution inside the joint, the connector 1 and the electrical insulation system 3a, 3b.

Moreover, the existence of a step implies a pressure loss towards the semiconducting layer that surrounds the connector 1. The section, which has an axial length here referred to as $I_{pressure\ loss}$, subjected to this pressure loss is even longer than the gap length $I_{gap}$. The risk of electrical breakdown is increased as soon as the pressure is lower than a nominal pressure, meaning that the length of the section with increased breakdown risk is even longer than the length of the gap length $I_{gap}$.

SUMMARY

The gap length $I_{gap}$ depends on the step size. In case the section $I_{pressure\ loss}$ is too long, the field lines 11 would cross this section, where the pressure is lower than the nominal pressure, as schematically shown in FIG. 4. This would severely reduce the electrical breakdown strength of the joint and the presence of the step $d_{top}$ could, therefore, have catastrophic consequences.

In view of the above, an object of the present disclosure is to provide a high voltage power cable joint device and a power cable which solve or at least mitigate the above-described problem.

Hence, according to a first aspect of the present disclosure there is provided a high voltage power cable joint device comprising: an elongated conductive connector having a first end face and a second end face opposite to the first end face, a field control body having a first semiconducting layer arranged circumferentially around the entire connector, and extending beyond the first end face and the second end face, wherein the first end face is provided with a first bore section and the second end face is provided with a second bore section, which first bore section and second bore section extend parallel with and are arranged offset from the central axis of the connector, wherein in a cross-section the connector has an outer surface which has a first outer surface portion that defines the curved portion of a first 120 degree elliptical sector centred at the centre of the first bore section, and which surrounds a perimeter portion of the first bore section, on which perimeter portion each point is radially, with respect to the centre of the first bore section, closer to the curved portion than any perimeter point of the first bore section outside the first 120 degree elliptical sector is to the outer surface, and wherein in a cross-section of the connector, the outer surface has a second outer surface portion that defines the curved portion of a second 120 degree elliptical sector centred at the centre of the second bore section, and which surrounds a perimeter portion of the second bore section, on which perimeter portion each point is radially, with respect to the centre of the second bore section, closer to the curved portion than any perimeter point of the second bore section outside the second 120 degree elliptical sector is to the outer surface , wherein a straight first through-opening extends from the first outer surface portion to the first bore section, wherein a straight second through-opening is axially displaced from the first through-opening and extends from the second outer surface portion to the second bore section, a first fastener arranged to be received by the first through-opening and arranged to extend into the first bore section, and a second fastener arranged to be received by the second through-opening and arranged to extend into the second bore section.

Due to the fact that the first and second through-openings extend from outer surface portions of the outer surface, which outer portions are radially closest to perimeter or inner wall(s) of the bore sections, conductors mounted in the first and second bore sections will be pressed towards the centre of the connector by the fasteners instead of away from the centre.

An effect which may be obtainable thereby is hence that the step between the connector and the outer surfaces of the electrical insulation system of the cable ends that are to be mounted into the high voltage power cable joint device may be reduced. This decreases the gap length, which thereby increases the electrical withstand strength of the high voltage power cable joint device.

According to one embodiment the first through-opening extends from a point on the first outer surface portion that is radially closest to the first bore section into the first bore section.

According to one embodiment the second through-opening extends from a point on the second outer surface portion that is radially closest to the second bore section into the second bore section.

According to one embodiment the first through-opening and the second through-opening are radial through-openings with respect to the central axis of the connector.

According to one embodiment the first through-opening has threads and the first fastener is a screw arranged to engage with the threads of the first through-opening, and wherein the second through-opening has threads and the second fastener is a screw arranged to engage with the threads of the second through-opening.

According to one embodiment the connector is made of metal.

According to one embodiment the connector is made of a single piece.

According to one embodiment the first bore section and the second bore section are coaxial.

According to one embodiment the first bore section and the second bore section define a single bore extending from the first end face to the second end face.

According to one embodiment the field control body comprises an electrical insulation layer arranged circumferentially around the entire first semiconducting layer.

According to one embodiment the field control body comprises a second semiconducting layer arranged circumferentially around the entire electrical insulation layer.

According to a second aspect of the present disclosure there is provided a high voltage power cable comprising: a first conductor, a first electrical insulation system arranged to electrically insulate the first conductor, a second conductor, a second electrical insulation system arranged to electrically insulate the second conductor, and a high voltage power cable joint device according to the first aspect presented herein, wherein the first conductor is arranged to be received in the first bore section, and wherein the first semiconducting layer is arranged to circumferentially cover a portion of the first electrical insulation system, and wherein the second conductor is arranged to be received in the second bore section, and wherein the first semiconducting layer is arranged to circumferentially cover a portion of the second electrical insulation system.

According to one embodiment the first fastener is arranged to fasten the first conductor to the connector, and wherein the second fastener is arranged to fasten the second conductor to the connector.

According to one embodiment the high voltage power cable is a high voltage direct current, HVDC, power cable.

According to one embodiment the high voltage power cable is a high voltage alternating current power cable.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which:

FIG. 7a shows a cross-section along lines A-A of the connector in FIG. 6;

FIG. 7b shows a first 120 degree elliptical circle sector of the connector in FIG. 6;

FIGS. 8a and 8b show cross-sections of the connector with a first conductor fastened inside the first bore section and a second conductor fastened inside the second bore section.

DETAILED DESCRIPTION

Figure 1:
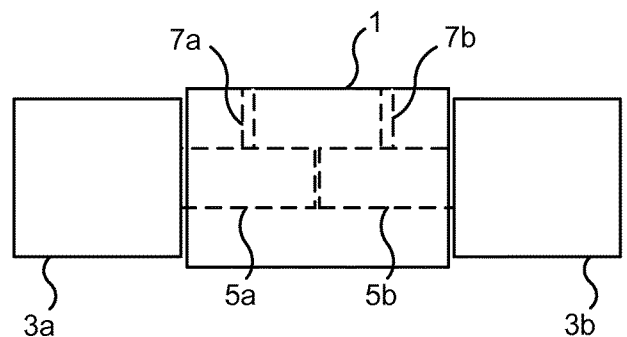
FIG. 1 schematically depicts a side view an example of certain parts of an ideal joint device, in which the conductors are shown inside the connector.
Figure 2A:
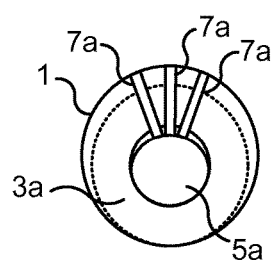
FIGS. 2a and 2b schematically shows a side view and cross-section of an example of a connector of an actual joint device which has been assembled with cable ends.
Figure 2B:
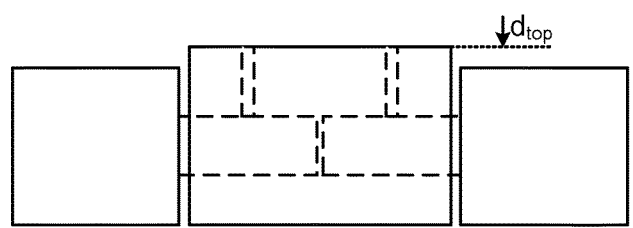
Figure 3A:
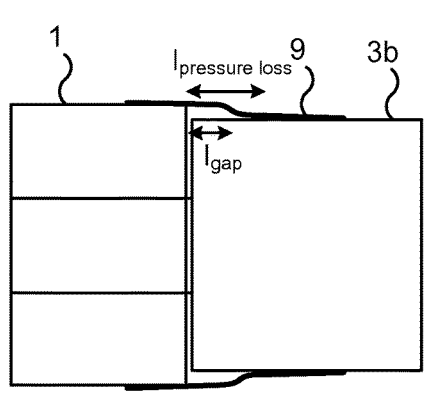
FIGS. 3a and 3b schematically show the ideal case of the interface between the connector and the electrical insulation system of a cable end, and an actual case, respectively.
Figure 3B:
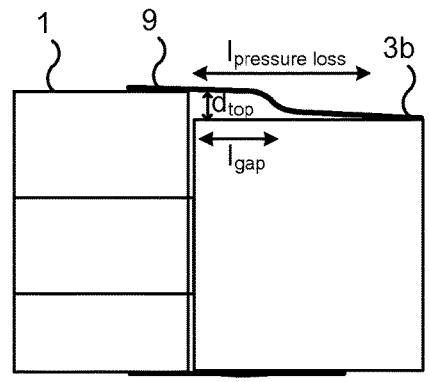
Figure 4:
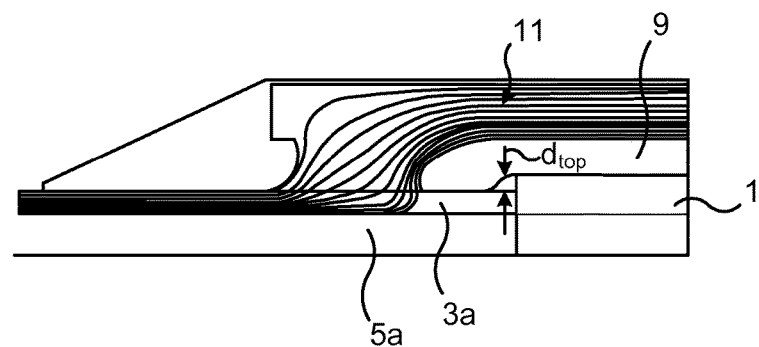
FIG. 4 schematically shows a longitudinal section of portion of a joint device with a cable end connected thereto, along axial and radial symmetry axes of the joint device, with the field distribution inside the joint device.

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The present disclosure relates to a high voltage power cable joint device of the prefabricated joint type. The high voltage power cable joint device is for jointing two high voltage power cable ends, to thereby form a single high voltage power cable.

Generally, the high voltage power cable joint device includes a connector that has an elongated shape and which is electrically conductive. The connector has a first end face and a second end face opposite to the first end face. The first end face is provided with a first bore section and the second end face is provided with a second bore section. The first bore section is arranged to receive a conductor of a first power cable end. The second bore section is arranged to receive a conductor of a second power cable end.

The first bore section is parallel with the central axis of the connector and arranged offset relative to the central axis. Also the second bore section is parallel with the central axis of the connector and arranged offset relative to the central axis.

The connector has a straight or rectilinear first through-opening extending from the outer surface, i.e. the periphery of the connector, to the first bore section. By straight is meant that there the first through-opening has no curves.

In a cross-section the connector has an outer surface which has a first outer surface portion that defines the curved portion of a first 120 degree elliptical sector centred at the centre of the first bore section, and which surrounds a perimeter portion of the first bore section, on which perimeter portion each point is radially, with respect to the centre of the first bore section, closer to the curved portion defined by first outer surface portion, than any perimeter point of the first bore section outside the first 120 degree elliptical sector is to the outer surface.

The connector has a straight or rectilinear second through-opening extending from the outer surface, i.e. the periphery of the connector, to the second bore section. By straight is meant that the second through-opening has no curves.

In a cross-section the connector has a second outer surface portion that defines the curved portion of a second 120 degree elliptical sector centred at the centre of the second bore section, and which surrounds a perimeter portion of the second bore section, on which perimeter portion each point is radially, with respect to the centre of the second bore section, closer to the curved portion defined by the second outer surface portion, than any perimeter point of the second bore section outside the second 120 degree elliptical sector is to the outer surface.

Furthermore, the high voltage power cable joint device has a first fastener which is arranged to be received in the first through-opening for a tight fit there between. The first fastener is arranged to extend into the first bore section straight from the first outer surface portion, preferably either radially with respect to the centre of connector or radially with respect to the centre of the first bore section. The high voltage power cable joint device also has a second fastener arranged to be received in the second through-opening for a tight fit there between. The second fastener is arranged to extend into the second bore section straight from the second outer surface portion, preferably radially with respect to the centre of the connector or radially with respect to the centre of the second bore section.

The high voltage power cable joint device furthermore comprises a field control body having a first semiconducting layer arranged circumferentially around the entire connector. The first semiconducting layer is hence annular, and has an axial extension which is greater than that of the connector. In particular, the first semiconducting layer extends beyond the first end face and the second end face of the connector.

With reference to FIGS. 5-8b an example of a high voltage power cable joint device will now be described.

Figure 5:
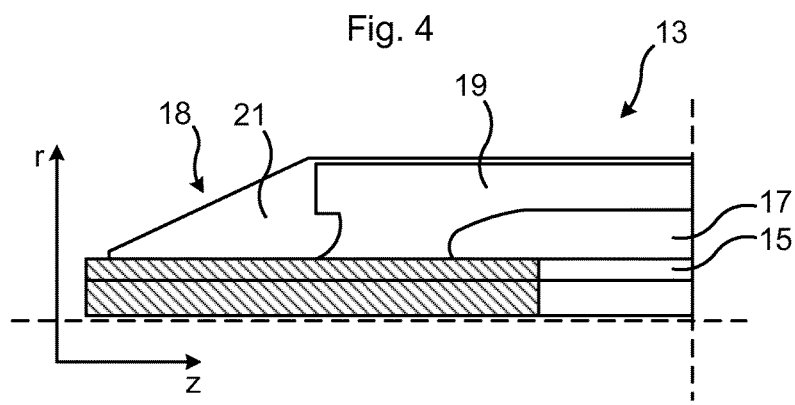
FIG. 5 shows a longitudinal section, along a centre axis symmetry line and a transverse axis symmetry line, of an example of a high voltage power cable joint device.

FIG. 5 shows an example of a high voltage power cable joint device 13 that comprises a connector 15, and a field control body 18 arranged to receive the connector 15 and having a first semiconducting layer 17 arranged circumferentially around the entire connector 15. The first semiconducting layer 17 has an axial extension which is greater than that of the connector 15 and extends beyond the connector 15 at both ends thereof.

Moreover, the exemplified high voltage power cable joint device 13 also comprises an electrical insulation layer 19 peripherally enclosing the first semiconducting layer 17, and a second semiconducting layer 21 arranged around the electrical insulation layer 19. The field control body 18 hence has a plurality of concentrically arranged layers provided around the connector 15. These layers are arranged to control the electromagnetic field distribution in the high voltage power cable joint device 13.

Figure 6:
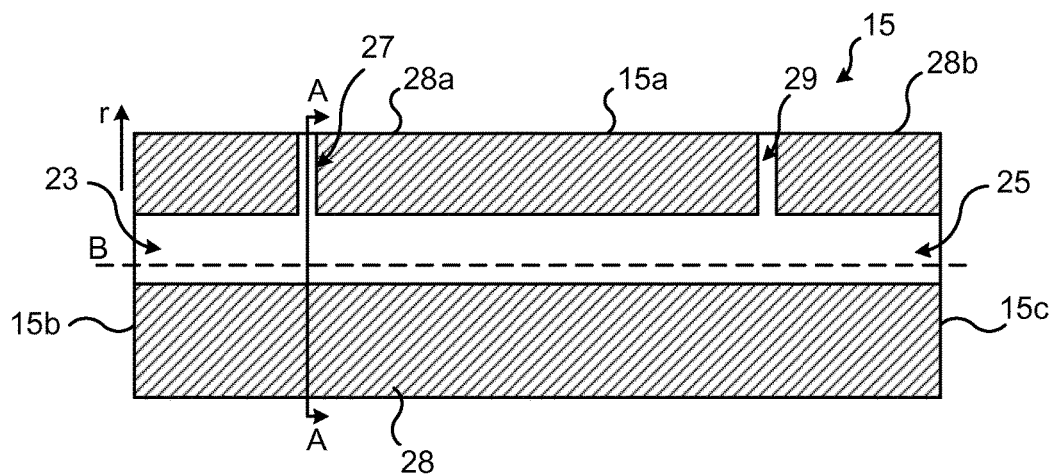
FIG. 6 schematically shows a longitudinal section of an example of a connector according to the present disclosure.

With reference to FIG. 6, an example of the connector 15 will be described in more detail. The connector 15 has an elongated body 15a, which according to one variation is generally cylindrical, and which has a first end face 15b and a second end face 15c opposite to the first end face 15b.

The first end face 15b is provided with a first bore section 23 and the second end face 15c is provided with a second bore section 25. The first bore section 23 extends parallel with and is arranged offset from the central axis B of the connector 15. The second bore section 25 extends parallel with and is arranged offset from the central axis B. The first bore section 23 and the second bore section 25 are preferably coaxial.

According to the example in FIG. 6, the first bore section 23 and the second bore section 25 form a single bore which defines a through-opening from the first end face 15b to the second end face 15c. This single bore may have the same diameter along its entire longitudinal extension, or the diameter may vary. The first bore section and the second bore section could alternatively be two distinct bores, i.e. bores that are not connected.

The connector 15 furthermore has a first through-opening 27 extending from the outer surface 28, in particular a first outer surface portion 28a, of the connector 15 into the first bore section 23, and a second through-opening 29 axially displaced relative to the first through-opening 27. The second through-opening 29 extends from the outer surface 28, in particular from a second outer surface portion 28b, into the second bore section 25.

Preferably, there is a plurality of first through-openings extending from the outer surface into the first bore section 23. They may be arranged in the same cross section, and according to one variation first through-openings may also be distributed axially along the first bore section 23. Furthermore, there are preferably a plurality of second through-openings extending from the outer surface into the second bore section 25, as illustrated in the cross-section of the connector 15 along lines A-A in FIG. 7. They may be arranged in the same cross section, and according to one variation second through-openings may also be distributed axially along the second bore section 25.

With reference to FIG. 7a, a cross-section of the connector 15 is shown. For illustrative purposes the curved portion 22 of a first 120 degree elliptical sector 24a of the connector 15 is marked with a thicker line than most other lines in FIG. 7a. The angle β of the first 120 degree elliptical sector 24a is hence 120 degrees. The first 120 degree elliptical sector 24a is better shown in FIG. 7b.

In the cross-section shown in FIG. 7a the first outer surface portion 28a forms the curved portion 22 of the first 120 degree elliptical sector 24a surrounding a perimeter portion 23a of the first bore section 23. The perimeter portion 23a included in the first 120 degree elliptical sector 24a and surrounded by the curved portion 22, is also marked with a thicker line for illustrative purposes. The curved portion 22 has end points 22a and 22b spaced 120 degrees apart with respect to the centre 26 of the first bore section 23. The radial distance, with respect to the centre 26 of the first bore section 23, from any point of the perimeter portion 23a to the first outer surface 28a, is shorter than the radial distance to the outer surface 28 from any point on the perimeter of the first radial bore 23 outside the 120 degree elliptical sector 24a. The wall thickness of the connector 15 is hence thinner at any point along the perimeter portion 23a inside the first 120 degree elliptical sector 24a than at any point along the other, complementary, perimeter of the first bore section 23.

In the exact same manner, in a cross-section of the connector 15 the second outer portion 28b defines the curved portion of a second 120 degree elliptical sector 24b, which curved portion is closer to any point on the perimeter portion 25a that it surrounds of the second bore section 25, with respect to a radial distance from the centre 30 of the second bore section 25, than to any point of the perimeter of the second bore section 25 outside the perimeter portion 25a is to the outer surface 28, as shown in FIG. 8b. To this end, each point along the perimeter portion 25a of the second bore section 25 enclosed by the second 120 degree elliptical sector 24b is closer to the curved portion 22 than any point of the complementary perimeter of the second bore section 25 is to the outer surface 28.

The first 120 degree elliptical sector could according to one variation for example be a first 90 degree elliptical sector. The same could also apply to the second 120 degree elliptical sector, i.e. it could for example be a 90 degree elliptical sector.

The cross-sectional shape of the first bore section may for example be elliptic e.g. circular, or polygonal such as rectangular. The cross-sectional shape of the second bore section may for example be elliptic e.g. circular, or polygonal such as rectangular.

As can be seen in the example in FIG. 7a, there may be a plurality of first through-openings 27 extending from the first outer surface portion 28a into the first bore section 23. One first through-opening 27 may extend radially from a point on the first outer surface portion 28a which is radially closest to the perimeter portion 23a of the first bore section 23. This first through-opening 27 is in the following referred to as the central first through-opening 28. The other first through-openings 27 may be at an angle relative to the axis 34 defined by the central first through-opening 27. These first through-openings 27 will be referred to as angled first through-openings 27.

The angle a between the axis defined by an angled first through-opening 27 and the axis 34 may for example be in the range 10-40 degrees with the apex being formed at the centre point 35 of the connector 15. The angled first through-openings 27 may beneficially be mirrored in the axis 34, so that the angled first through-openings 27 are arranged symmetrically with respect to the axis 34 and thus the central first through-opening 27.

What has been described above may according to one variation also apply to the second bore section 25 and the corresponding second through-opening(s).

As shown in FIGS. 8a and 8b the high voltage power cable joint device 13 includes a first fastener 31 arranged to be received in the first through-opening 27 and a second fastener 33 arranged to be received in the second through-opening 29. The first fastener 31 is arranged to fasten a first conductor inside the connector 15. The second fastener 33 is arranged to fasten a second conductor inside the connector 15. According to the example in FIGS. 8a and 8b, there are is plurality of first fasteners 31, each being mounted in a respective first through-opening 27, and a plurality of second fasteners 33, each being mounted in a respective second through-opening 29.

The first fastener 31 may be a screw, and the first through-opening 27 may have a threaded inner surface arranged to engage with the first fastener 31. This may also apply for each first fastener and each first through-opening in case there are several. The second fastener 33 may be a screw, and the second through-opening 29 may have a threaded inner surface arranged to engage with the second fastener 33. This may also apply for each second fastener and each second through-opening in case there are several, like in FIGS. 8a and 8b.

In FIG. 8a, it can be seen that a first conductor C1 of a first cable end is fastened by the first fasteners 31, pressing the first conductor C1 towards the distal wall, relative to the first through-openings 27, of the first bore section 23. The first conductor C1 is thereby deformed. Due to the offset bore design and the position of the through-openings, the step between the electrical insulation system of the first cable end connected to the high voltage power cable joint device 13 may be minimised. FIG. 8b shows the same configuration for a second conductor C2 of a second cable end.

Figure 9:
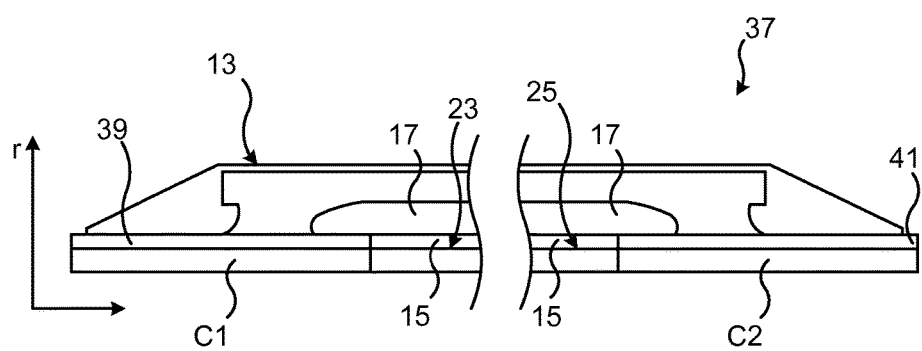
FIG. 9 shows an example of a high voltage power cable including a high voltage power cable joint device.

FIG. 9 shows a longitudinal section of an example of a high voltage power cable 37 that includes the high voltage power cable joint device 13, a first conductor C1 arranged in the first bore section 23 and a second conductor C2 arranged in the second bore section 25. The power cable 37 also has a first electrical insulation system 39 arranged to electrically insulate the first conductor C1, and a second electrical insulation system 41 arranged to electrically insulate the second conductor C2. The first electrical insulation system 39 and the second electrical insulation system 41 may for example comprise cross-linked polyethylene (XLPE).

In an assembled state, the first semiconducting layer 17 covers a portion of the first electrical insulation system 39 and a portion of the second electrical insulation system 41. The first semiconducting layer 17 hence overlaps the connector 15 and the first electrical insulation system 39, and the connector and the second electrical insulation system 41.

The first conductor C1 and the second conductor C2 are typically not solid, but are instead of a stranded type, e.g. of Milliken type or of segmented type. Moreover, generally, the first conductor C1 has a smaller diameter than the first bore section 23 and the second conductor C2 has a smaller diameter than the second bore section 25.

The connector 15 is made of an electrically conductive material with high mechanical withstand strength, e.g. metal such as steel, copper or aluminium. The connector 15 may be made of one single integrated solid piece or it may be made of several parts.

The high voltage power cable joint device may preferably be arranged for use in 150 kV applications or above. The high voltage power cable 37 may for example be a High Voltage Direct Current (HVDC) power cable or an alternating current high voltage power cable, for land or sea application.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:
1. A high voltage power cable joint device comprising:
   an elongated conductive connector having a first end face and a second end face opposite to the first end face,
   a field controlling body having a first semiconducting layer arranged circumferentially around the entire connector, and extending beyond the first end face and the second end face, wherein the first end face is provided with a first bore section and the second end face is provided with a second bore section, which first bore section and second bore section extend parallel with and are arranged offset from the central axis of the connector, wherein in a cross-section the connector has an outer surface which has a first outer surface portion that defines the curved portion of a first 120 degree elliptical sector centred at the centre of the first bore section, and which surrounds a perimeter portion of the first bore section, on which perimeter portion each point is radially, with respect to the centre of the first bore section, closer to the curved portion than any perimeter point of the first bore section outside the first 120 degree elliptical sector is to the outer surface, and wherein in a cross-section of the connector, the outer surface has a second outer surface portion that defines the curved portion of a second 120 degree elliptical sector centred at the centre of the second bore section, and which surrounds a perimeter portion of the second bore section, on which perimeter portion each point is radially, with respect to the centre of the second bore section, closer to the curved portion than any perimeter point of the second bore section outside the second 120 degree elliptical sector is to the outer surface, wherein a straight first through-opening extends from the first outer surface portion to the first bore section, wherein a straight second through-opening is axially displaced from the first through-opening and extends from the second outer surface portion to the second bore section, a first fastener arranged to be received by the first through-opening and arranged to extend into the first bore section, and a second fastener arranged to be received by the second through-opening and arranged to extend into the second bore section.

2. The high voltage power cable joint device as claimed in claim 1, wherein the first through-opening extends from a point on the first outer surface portion that is radially closest to the first bore section into the first bore section.

3. The high voltage power cable joint device as claimed in claim 1, wherein the second through-opening extends from a point on the second outer surface portion that is radially closest to the second bore section into the second bore section.

4. The high voltage power cable joint device as claimed in claim 1, wherein the first through-opening and the second through-opening are radial through-openings with respect to the central axis of the connector.

5. The high voltage power cable joint device as claimed in claim 1, wherein the first through-opening has threads and the first fastener is a screw arranged to engage with the threads of the first through-opening, and wherein the second through-opening has threads and the second fastener is a screw arranged to engage with the threads of the second through-opening.

6. The high voltage power cable joint device as claimed in claim 1, wherein the connector is made of metal.

7. The high voltage power cable joint device as claimed in claim 6, wherein the connector is made of a single piece.

8. The high voltage power cable joint device as claimed in claim 1, wherein the first bore section and the second bore section are coaxial.

9. The high voltage power cable joint device as claimed in claim 1, wherein the first bore section and the second bore section define a single bore extending from the first end face to the second end face.

10. The high voltage power cable joint device as claimed in claim 1, wherein the field control body includes an electrical insulation layer arranged circumferentially around the entire first semiconducting layer.

11. The high voltage power cable joint device as claimed in claim 10, wherein the field control body includes a second semiconducting layer arranged circumferentially around the entire electrical insulation layer.

12. A high voltage power cable including:
a first conductor,
a first electrical insulation system arranged to electrically insulate the first conductor,
a second conductor,
a second electrical insulation system arranged to electrically insulate the second conductor, and
a high voltage power cable joint device, comprising:
an elongated conductive connector having a first end face and a second end face opposite to the first end face,
a field controlling body having a first semiconducting layer arranged circumferentially around the entire connector, and extending beyond the first end face and the second end face,
wherein the first end face is provided with a first bore section and the second end face is provided with a second bore section, which first bore section and second bore section extend parallel with and are arranged offset from the central axis of the connector,
wherein in a cross-section the connector has an outer surface which has a first outer surface portion that defines the curved portion of a first 120 degree elliptical sector centred at the centre of the first bore section, and
which surrounds a perimeter portion of the first bore section, on which perimeter portion each point is radially, with respect to the centre of the first bore section, closer to the curved portion than any perimeter point of the first bore section outside the first 120 degree elliptical sector is to the outer surface,
and wherein in cross-section of the connector, the outer surface has a second outer surface portion that defines the curved portion of a second 120 degree elliptical sector centred at the centre of the second bore section, and which surrounds a perimeter portion of the second bore section, on which perimeter portion each point is radially, with respect to the centre of the second bore section, closer to the curved portion than any perimeter point of the second bore section outside the second 120 degree elliptical sector is to the outer surface,
wherein a straight first through-opening extends from the first outer surface portion to the first bore section,
wherein a straight second through-opening is axially displaced from the first through-opening and extends from the second outer surface portion to the second bore section,
a first fastener arranged to be received by the first through-opening and arranged to extend into the first bore section, and
a second fastener arranged to be received by the second through-opening and arranged to extend into the second bore section, wherein the first conductor is arranged to be received in the first bore section, and wherein the first semiconducting layer is arranged to circumferentially cover a portion of the first electrical insulation system, and wherein the second conductor is arranged to be received in the second bore section, and wherein the first semiconducting layer is arranged to circumferentially cover a portion of the second electrical insulation system.

13. The high voltage power cable as claimed in claim 12, wherein the first fastener is arranged to fasten the first conductor to the connector, and wherein the second fastener is arranged to fasten the second conductor to the connector.

14. The high voltage power cable as claimed in claim 12 wherein the high voltage power cable is a high voltage direct current, HVDC, power cable.

15. The high voltage power cable as claimed in claim 12, wherein the high voltage power cable is a high voltage alternating current power cable.

16. The high voltage power cable joint device as claimed in claim 2, wherein the second through-opening extends from a point on the second outer surface portion that is radially closest to the second bore section into the second bore section.

17. The high voltage power cable joint device as claimed in claim 2, wherein the first through-opening and the second through-opening are radial through-openings with respect to the central axis of the connector.

18. The high voltage power cable joint device as claimed in claim 2, wherein the first through-opening has threads and the first fastener is a screw arranged to engage with the threads of the first through-opening, and wherein the second through-opening has threads and the second fastener is a screw arranged to engage with the threads of the second through-opening.

19. The high voltage power cable as claimed in claim 13, wherein the high voltage power cable is a high voltage direct current, HVDC, power cable.

20. The high voltage power cable as claimed in claim 13, wherein the high voltage power cable is a high voltage alternating current power cable.

* * * * *